US008418068B1

(12) United States Patent
Backus et al.

(10) Patent No.: US 8,418,068 B1
(45) Date of Patent: Apr. 9, 2013

(54) SYSTEM, SOFTWARE APPLICATION, AND METHOD FOR CUSTOMIZING A HIGH-RESOLUTION IMAGE VIA THE INTERNET

(75) Inventors: Brian N. Backus, San Francisco, CA (US); Duncan A. Meech, Rohned Park, CA (US)

(73) Assignee: Brian Backus, San Francisco, CA (US)

( * ) Notice: Subject to any disclaimer, the term of this patent is extended or adjusted under 35 U.S.C. 154(b) by 797 days.

(21) Appl. No.: 12/592,829

(22) Filed: Dec. 2, 2009

Related U.S. Application Data

(60) Provisional application No. 61/200,971, filed on Dec. 5, 2008.

(51) Int. Cl.
*G09G 5/00* (2006.01)

(52) U.S. Cl.
USPC .......................... 715/748; 715/964; 345/619

(58) Field of Classification Search .................. 715/765, 715/748, 749, 744–747, 855, 705–712, 770, 715/780, 964; 345/619, 428, 600, 698; 382/309, 382/302, 162; 709/203, 220, 327
See application file for complete search history.

(56) References Cited

U.S. PATENT DOCUMENTS

| | | | | | |
|---|---|---|---|---|---|
| 5,949,551 | A * | 9/1999 | Miller et al. | .................. | 358/408 |
| 6,167,382 | A * | 12/2000 | Sparks et al. | ............... | 705/14.73 |
| 6,611,349 | B1 * | 8/2003 | Vogt et al. | .................... | 358/1.15 |
| 6,704,024 | B2 * | 3/2004 | Robotham et al. | ............ | 345/581 |
| 6,850,248 | B1 * | 2/2005 | Crosby et al. | .................. | 345/619 |
| 6,886,028 | B1 * | 4/2005 | Matsuyama et al. | .......... | 709/203 |
| 7,050,079 | B1 * | 5/2006 | Estrada et al. | ................ | 715/760 |
| 7,222,306 | B2 * | 5/2007 | Kaasila et al. | ................ | 715/801 |
| 7,312,802 | B2 * | 12/2007 | Komornicki et al. | ......... | 345/619 |
| 7,382,380 | B1 * | 6/2008 | Crosby et al. | ................ | 345/619 |
| 7,864,186 | B2 * | 1/2011 | Robotham et al. | ............ | 345/581 |
| 8,130,237 | B2 * | 3/2012 | Zimmer | ........................ | 345/619 |
| 2002/0054115 | A1 * | 5/2002 | Mack et al. | .................... | 345/765 |
| 2002/0099524 | A1 * | 7/2002 | Sell et al. | .......................... | 703/1 |
| 2003/0107760 | A1 * | 6/2003 | King et al. | .................... | 358/1.15 |
| 2003/0182402 | A1 * | 9/2003 | Goodman et al. | ............ | 709/220 |
| 2004/0131330 | A1 * | 7/2004 | Wilkins et al. | ................. | 386/55 |
| 2005/0052469 | A1 * | 3/2005 | Crosby et al. | ................ | 345/619 |
| 2005/0235201 | A1 * | 10/2005 | Brown et al. | .................. | 715/517 |
| 2006/0044599 | A1 * | 3/2006 | Lipowitz et al. | ............. | 358/1.15 |
| 2008/0109552 | A1 * | 5/2008 | Tamir et al. | ................... | 709/229 |
| 2009/0144615 | A1 * | 6/2009 | Brown et al. | ................. | 715/243 |
| 2010/0115440 | A1 * | 5/2010 | Hertzfeld | ...................... | 715/765 |
| 2011/0258070 | A1 * | 10/2011 | Lynch et al. | ................. | 705/26.5 |

* cited by examiner

*Primary Examiner* — Steven Sax
(74) *Attorney, Agent, or Firm* — Lessani Law Group, PC

(57) ABSTRACT

The present invention provides a system, method, and software program for enabling a user to create a customized, high-resolution version of an image (such as artwork) via the Internet. An artist/developer creates an image set comprising one or more base images, as well as any optional image objects that can be added to the base image. The artist/developer uses a script-creation tool to generate a computer-readable script that specifies how to generate an image based on the image set. The script, as well as multiple resolutions of the image set, are stored on a server. When an end user customer desires to customize the image, the server sends the script file and a lower-resolution version of the image set to the user's computer. The user's browser runs the script to create a graphical user interface through which the user can edit the image data in the script file. After the user customizes the image, the modified script file is stored on the server-side. High quality prints can be created from the modified script file and a high-resolution version of the image set.

20 Claims, 14 Drawing Sheets

SYSTEM, SOFTWARE APPLICATION, AND METHOD FOR CUSTOMIZING A HIGH-RESOLUTION IMAGE VIA THE INTERNET

RELATED APPLICATIONS

This application claims the benefit of U.S. Provisional Application No. 61/200,971 filed on Dec. 5, 2008 with inventors Brian Backus and Duncan Meech and titled "A System, Software Application, and Method for Customizing Media via the Internet," the contents of which are incorporated by reference as if fully disclosed herein.

BACKGROUND OF THE INVENTION

1. Field of the Invention

This invention relates generally to image customization, and, more specifically, to an automated method for enabling an end user to create a customized, high-resolution version of an image via the Internet.

2. Description of the Background Art

Artists sometimes sell commissioned artwork that is customized for a client. With respect to art that is in digital form, image or photo-editing software, such as ADOBE's PHOTOSHOP, often is used to edit and customize digital images. For images with a lot of graphics and text elements, customizing the image can be a very complicated process. The resulting files are massive and can have thousands of image layers. An artist often will need to create a few hundred image layers, compress the file, create a few hundred more image layers, compress the file, and so on until the customized work is complete. Two main disadvantages with this process are (1) it is very labor intensive; and (2) the artist is required to do all the individual customization work on behalf the commissioning client.

Therefore, it is desirable to have a simpler way to customize digital artwork (and other images) that enables the client to customize the artwork himself.

SUMMARY

The present invention provides a system, method, and software program for enabling a user to create a customized, high-resolution version of an image (such as artwork) via the Internet. An artist/developer creates an image set comprising one or more base images, as well as any optional image objects that can be added to the base image. The artist/developer uses a script-creation tool to generate a computer-readable script that specifies how to generate an image based on the image set. The computer-readable script defines the ways a user can modify the customizable image. The computer-readable script also specifies how to generate a graphical user interface via which a user can make changes to modifiable image data in the computer-readable script.

The script, as well as multiple resolutions of the image set, are stored on a server. The resolutions stored include a high-resolution version necessary to create high-quality prints of the image, as well as one or more lower-resolution versions that can be easily downloaded to a customer's computer.

When an end user customer desires to customize the image, the server sends the script file and a lower-resolution version of the image set to the user's computer. The user's web browser runs the script to create a graphical user interface through which the user can edit the modifiable image data in the script file. The original script file and image set is used to generate a template in the web browser that serves as a starting point for the user. As the user modifies the template, the script file is modified accordingly. After the user customizes the image, the modified script file is sent back to the server and stored on the server-side. In the preferred embodiment, no image files are transferred back to the server, as all the user's changes are represented in the script file. If the user orders a print of the customized image on a medium (such as book, canvas, cloth, jigsaw, etc.), the server generates a high-resolution version of the image using the modified script file and a high-resolution version of the image set.

DETAILED DESCRIPTION OF THE PREFERRED EMBODIMENTS

Figure 1:
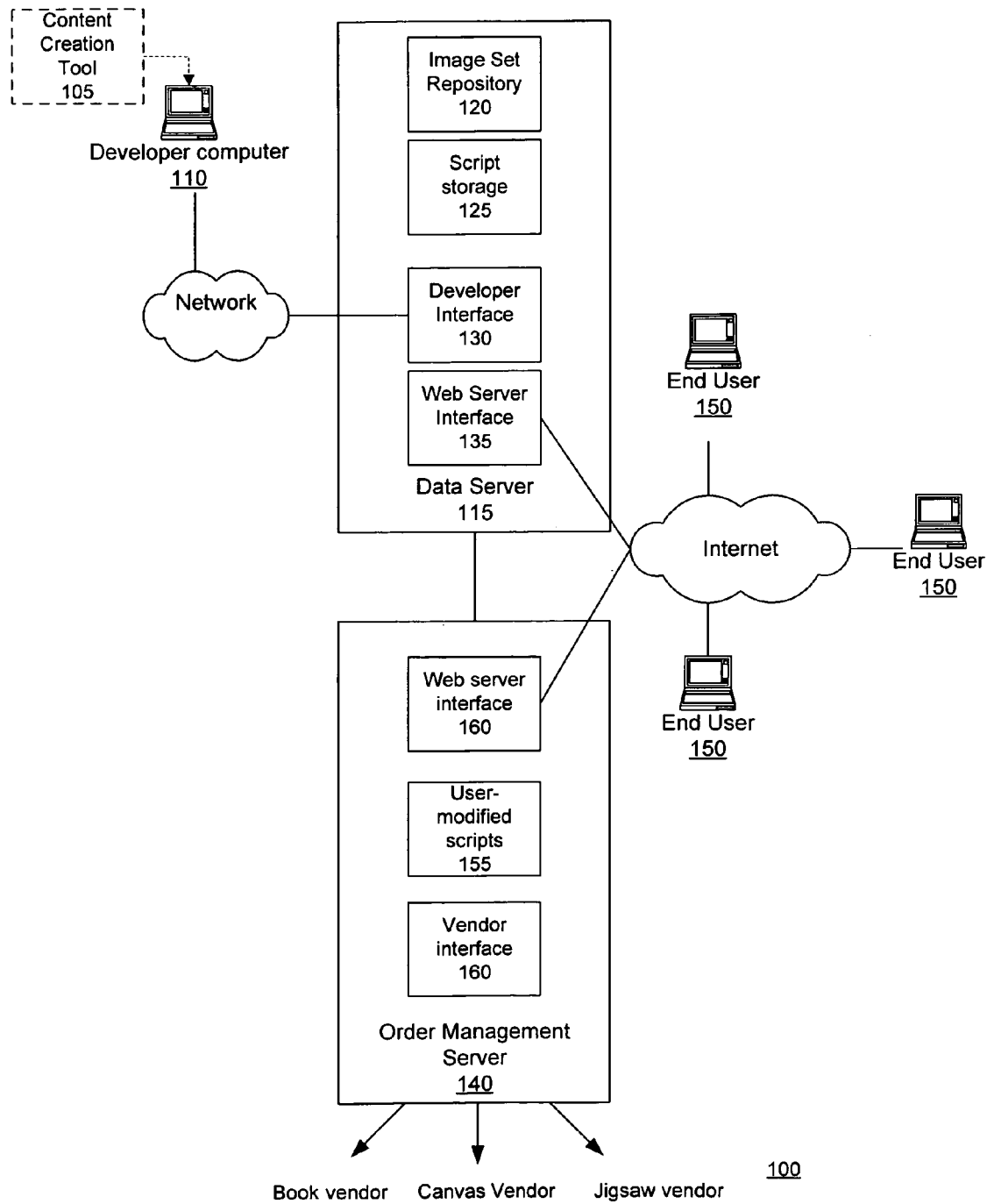
FIG. 1 illustrates an example system in which the present invention can be implemented.

The present invention provides a system, method, and software program for enabling a user to create a customized, high-resolution version of an image via the Internet. FIG. 1 illustrates an example system in which the present invention can be implemented. System 100 includes a Content Creation Tool 105 that is used by developers to create a computer-readable script for the customizable image. The computer-readable script is described in more detail below. In the preferred embodiment, the Content Creation Tool 105 comprises a software program that runs on either the developer's client computer 110 or a server (such as Data Server 115) connected (via a network) to developer's client computer 110.

System 100 includes a Data Server 115 that comprises image storage 120, script storage 125, developer interface 130, and web server interface 135. The Content Creation Tool 105 interfaces with the Data Server 115 via the developer interface 130, and end users 150 interface with the Data Server 115 via the Internet and the web server interface 135.

System 100 also includes an Order Management Server 140 that generates a high-resolution version of a customized image in response to a user order. The Order Management Server 140 stores user-modified scripts (described below) in script storage 155. End users 150 can interface with System 100 via the Internet and web server interface 160. The Order Management Server 140 interfaces with vendors via vendor interface 165. The operation of the Data Server and the Order Management Server is described in more detail below with respect to FIGS. 2 and 3.

Figure 2A:
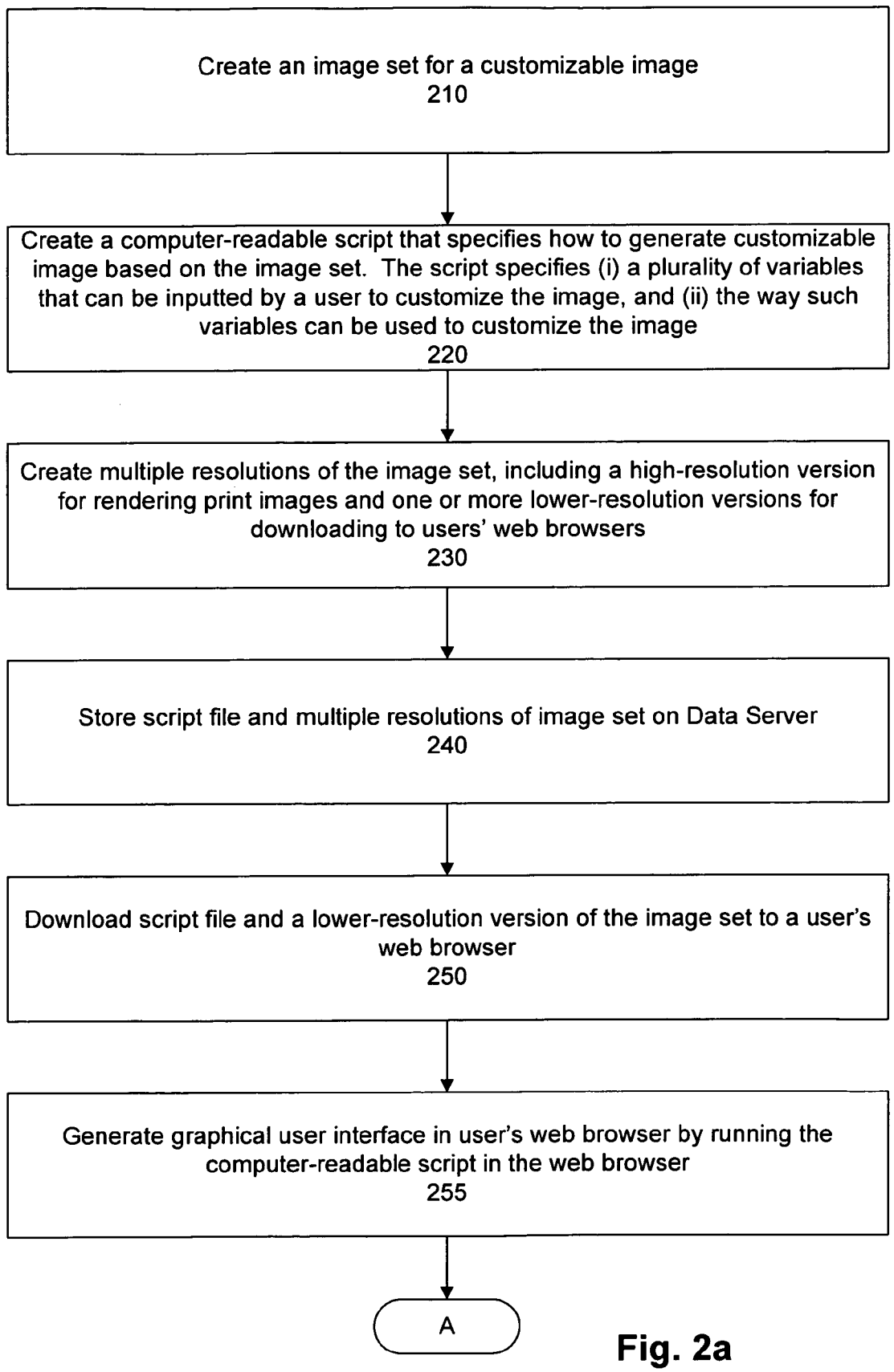
FIGS. 2a-2b are flowcharts that illustrate a method, according to one embodiment of the present invention, for enabling a user to create a customized, high-resolution image via the Internet.
Figure 2B:
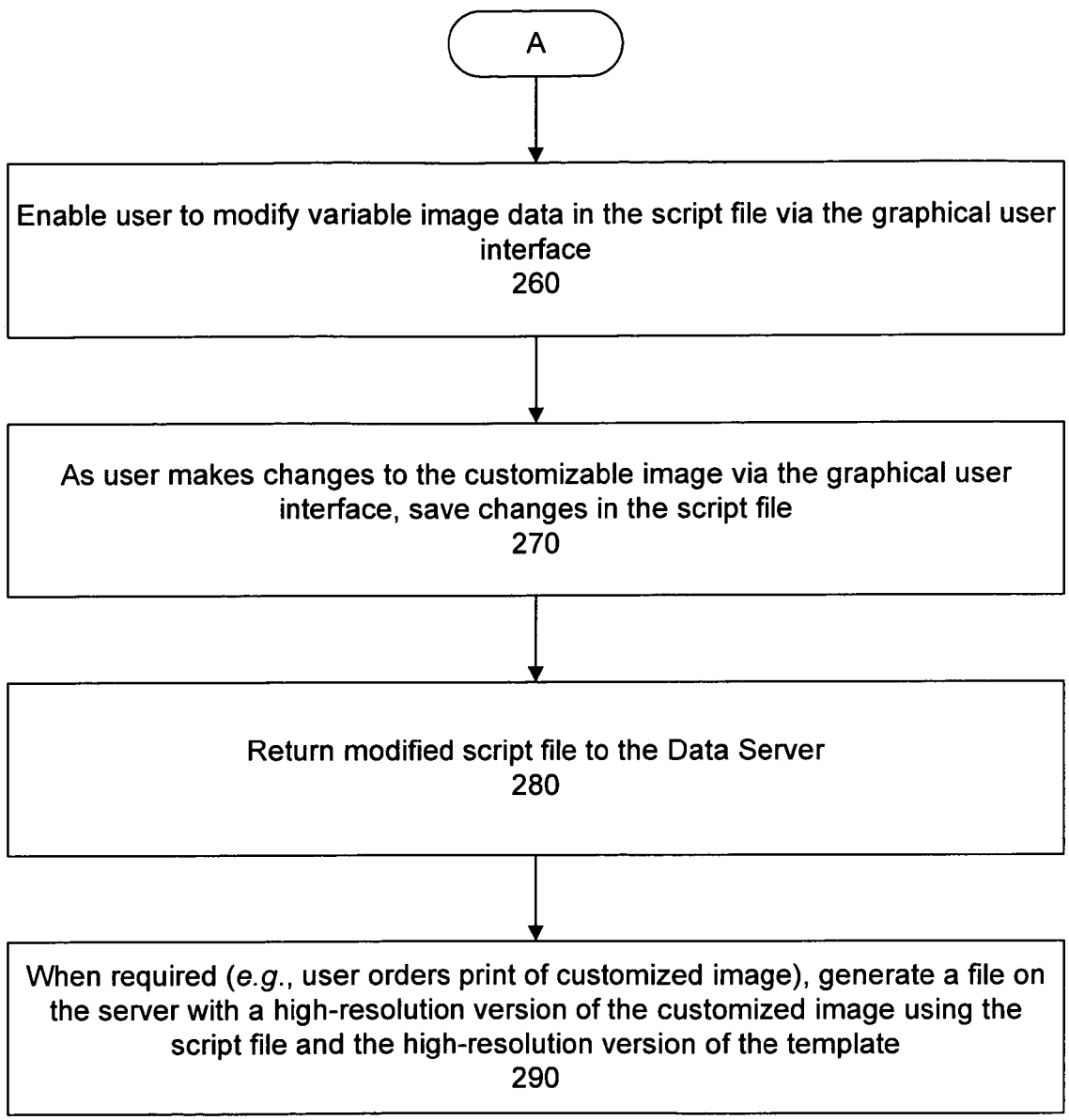

FIG. 2 illustrates a method for enabling a user to create a high-resolution customizable image via the Internet. The method is described with respect to the example system in FIG. 1, but the method illustrated in FIG. 2, as well as the methods of FIGS. 3-8, can be implemented with a different system configuration than that shown in FIG. 1.

A developer creates an image set for a customizable image (step 210). The image set includes at least one base image and zero or more other graphical elements that can be added to the base image(s).

Using the Content Creation Tool 105, the developer creates a computer-readable script file that specifies how to generate an image based on the image set (step 220). Specifically, the computer-readable script references the image set and specifies (i) a plurality of variables that can be inputted by a user and (ii) the way such variables are used to customize the image. The variables can include modifiable portions of text elements, as well as optional image objects that can be added to the base image. In one embodiment, the script file created by the developer includes a default value for each of the variables. The computer-readable script also includes instructions for generating a graphical user interface via which a user can modify the variable image data in the script.

The Content Creation Tool 105 generates multiple resolutions of the image set, ranging from a high-resolution version necessary for rendering high-quality prints to lower-resolution versions that can be downloaded to a web browser (step 230). The developer sends the script and image set to the Data Sever via the developer interface, and the Data Server 115 stores the script file and image set (step 240).

When a user's computer requests one or more web pages provided by the Data Server 115 (via the web server interface 135) related to image customization, the Data Server 115 downloads the script file and the image set with the web-page(s) (step 250). The resolution of the downloaded version depends on the user's web browser and connection rate. The highest resolution version of the image set is typically a very large file, as necessary for high-quality printing of images. Such a large file may take too long to download to a user, and it may be too big for a user's computer to adequately handle. Therefore, in the preferred embodiment, a lower-resolution version of the image set is downloaded to the user's web browser.

The user's web browser runs the computer-readable script and generates a graphical user interface based on the computer-readable script (step 255). The user is allowed to modify the variable image data in the script file via the graphical user interface (step 260). In one embodiment, generating the graphical user interface includes displaying a template, or starting version, for the customizable image using the default settings in the script file. The user is then able to customize the template via the graphical user interface. By modifying the template in the graphical user interface, the user is editing the script file. As the user makes changes, the changes are illustrated in the graphical user interface, and saved in the script file (step 270).

When a user elects to save the customized image, the modified script file is then sent back to the Data Server 115 (step 280). It is not necessary to send images back to the Data Server 115, as the Data Server 115 already has a copy of the image set. All the user's changes are reflected in the modified script file. In an alternate embodiment of the invention, every time a user makes a change to the script file via the graphical user interface, the change is automatically saved on the Data Server 115.

Figure 7:
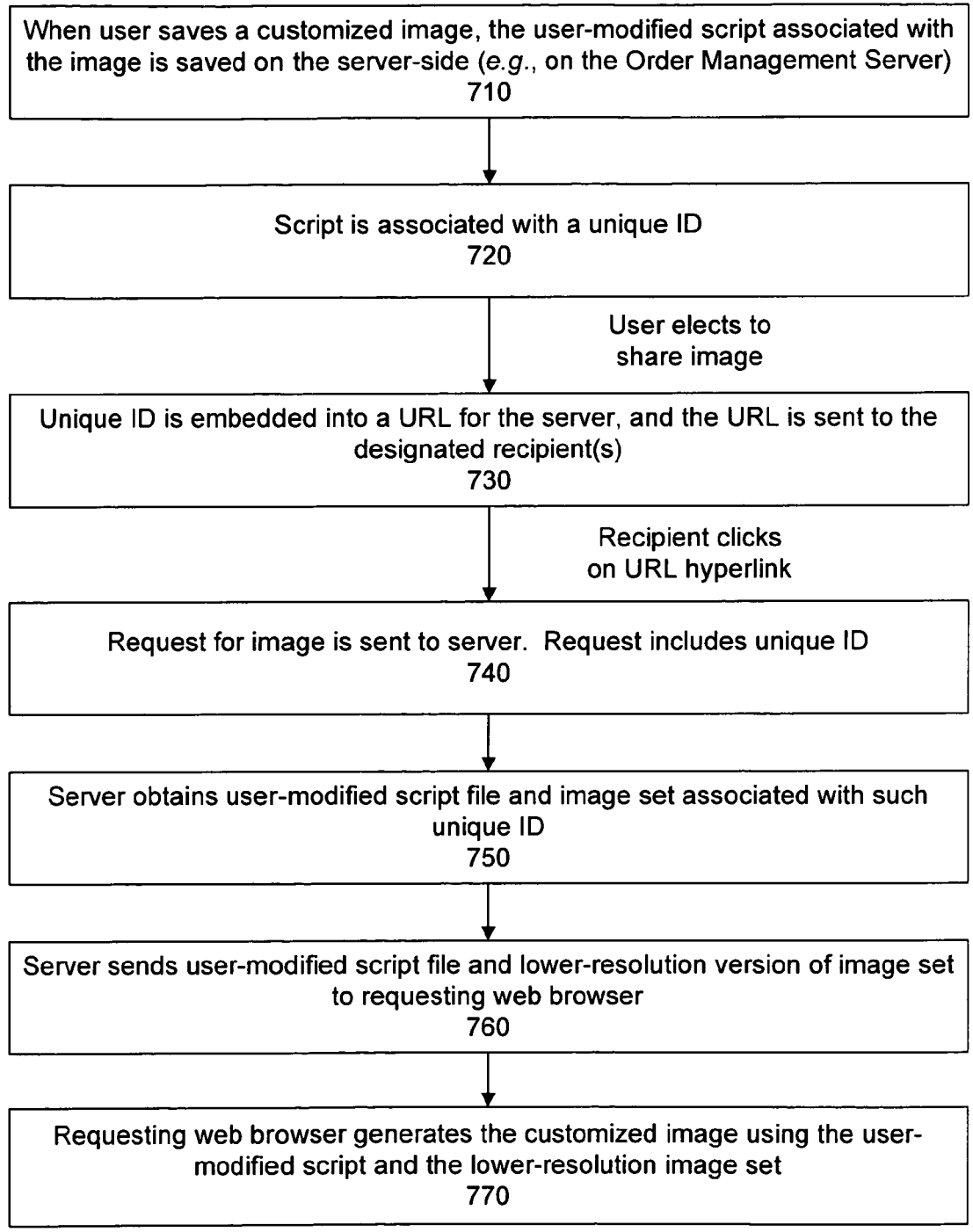
FIG. 7 is a flowchart that illustrates a method, according to one embodiment of the present invention, for enabling a user to share a customized image with other users.

In one embodiment, the user can order a printed version of the image (e.g., on a canvas, in a book, on a jigsaw, etc) or elect to share the customized image with other people (see FIG. 7). In response to a user ordering a printed version, the order management server generates a high-resolution version of the customized images using the user-modified script file and the highest-resolution version of image set stored on data server (step 290). The high-resolution image is then rendered by a print vendor. In one embodiment, the print vendor is sent a URL that includes a unique identifier for the user's script file, and the high-resolution image is generated only when the vendor clicks on the URL (i.e., in such embodiment, the high-resolution image is generated on an as-needed basis).

Figure 3:
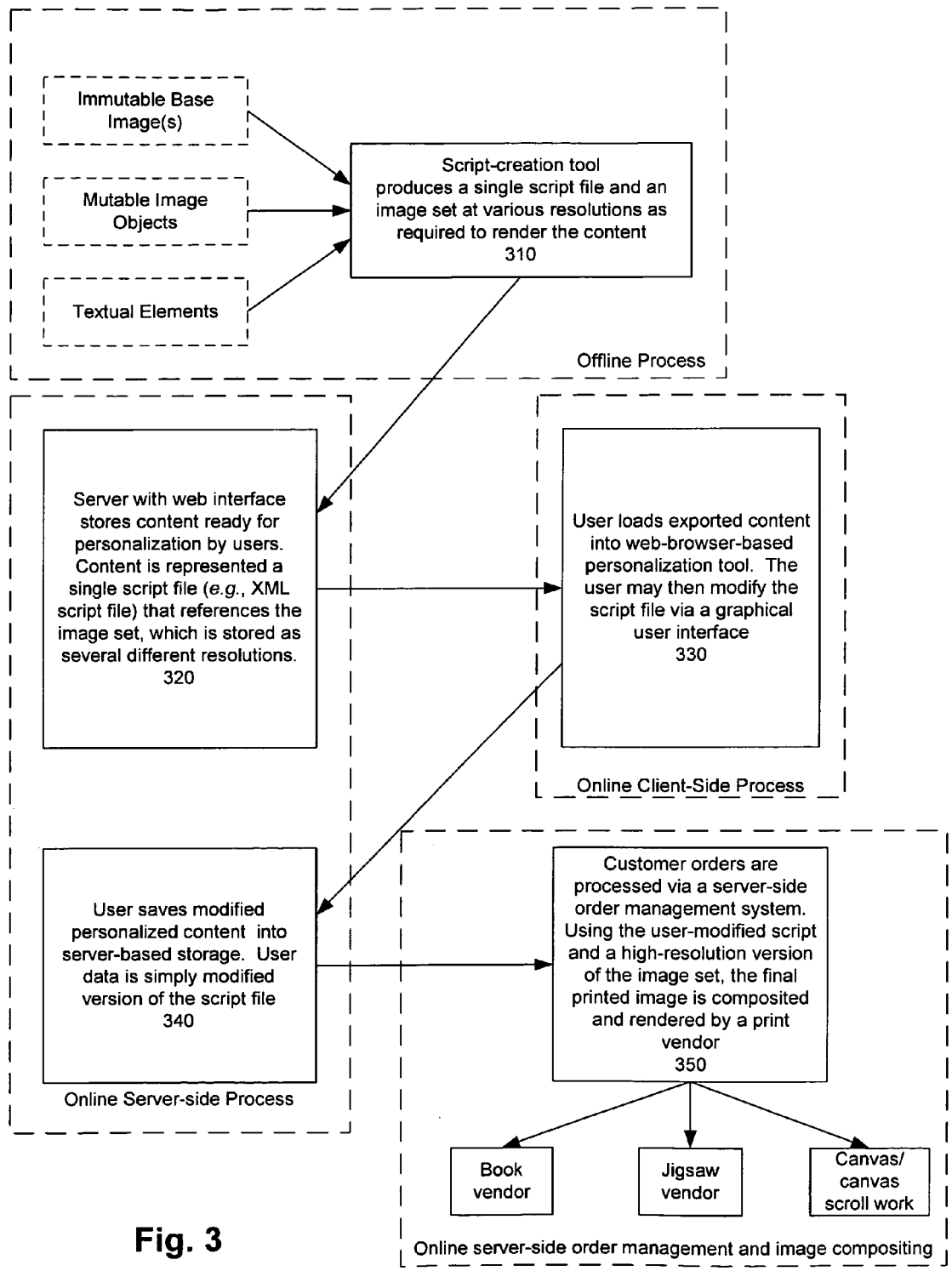
FIG. 3 illustrates a process flow, according to one embodiment of the present invention, for creating and printing a customized image.

FIG. 3 illustrates another view of the process flow according to one example embodiment of the present invention. A script-creation tool produces a computer-readable script file and an image set at various resolutions as required to render the content (310). The developer can do this offline. In this example, the script file defines text elements, and it references an image set that includes one or more immutable base image(s) and one or more mutable image objects. The computer-readable script specifies how to generate an image based on the image set, as well as how to generate a graphical user interface (GUI) via which a user can modify the image data in the script file. It also specifies the ways in which the image data can be modified. In the preferred embodiment, the script is an XML script.

A server with a web interface stores content ready for personalization by users (320). The content is represented as a computer-readable script file that references the image set stored at several different resolutions. The user loads the content into a web-browser based personalization tool which is generated by running the script within the web browser (330). The image set loaded is typically one of the lower-resolution image sets. The user then may modify modifiable data in the script file via a graphical user interface (330).

The user saves modified personalized content into server-based storage (340). The user data is simply a modified version of the computer-readable script file.

The user can then order printed versions of their customized content. Customer orders are processed by a server-side order management system (350). Using the user-modified-script and the image set, the printed image is composited and rendered by one or more various print vendors (e.g., a book vendor, a jigsaw vendor, or a canvas vendor) (350).

Figure 4:
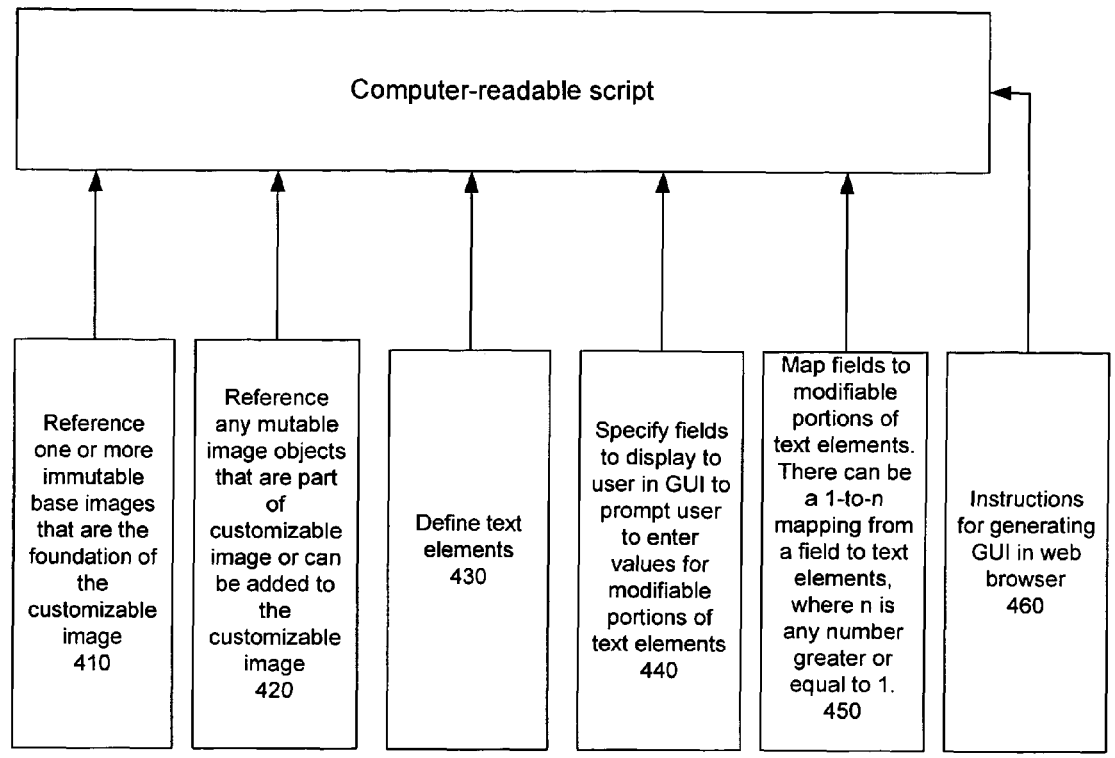
FIG. 4 is a block diagram that illustrates example requirements of a computer-readable script file according to one embodiment of the present invention.

The Content Creation Tool is a script-development program. It enables a user to create a script that can be used to render an image, as well as provide a graphical user interface to the end user. In the preferred embodiment, the output of the Content Creation Tool is (1) an XML script file and (2) multiple resolutions of an image set. FIG. 4 illustrates an example of the requirements of the computer-readable script file according to one embodiment of the present invention. The script file references one or more immutable base images that are the foundation of the customizable image (410). If users are only customizing one image, there typically is only one immutable base image. If the users are customizing a set of images (as is the case if the user is customizing images for a book), there are usually multiple base images.

The script file also references any mutable image objects that are added to or can be added to the base image (420). Mutable image objects are optional objects that a user can add or delete to/from the customizable image. Also, in some cases, users may be able to edit mutable objects, such as changing the size, placement on the base image, rotation, orientation, color, etc. In one embodiment, a user can also associate URLs with mutable image objects.

If the customizable image includes text elements, the script file defines the text elements and specifies the modifiable portions of the text elements (430). In the preferred embodiment, the script file also specifies the fields displayed to the user in the GUI to prompt the user to enter values for the modifiable portions of the text elements (440). Furthermore, the script file includes a mapping of such fields to modifiable portions of the text elements (450). There can be a one-to-many mapping from the fields to the text elements. For example, a user entering a value in one field can cause multiple text elements on the image to change.

The script file also includes instructions for generating a graphical user interface (460). In the preferred embodiment, the script file is an XML file run by a flash player in the user's web browser.

Below in an example of a fragment from an XML script file that defiles a text element in an image:
<TextElement Text="{[Name 14-Maybe a parent]saurous[Bluesaurous]}" UserText="Christopher" Color="0xFF0000" Shadow="0xFFFFFF" FontName="Duality" FontSize="20" Scale="2,2" Rotation="45.0" Translation="5051.9,3137.9" Bounds="–39.17822,–16.79167,39.17822,–16.79167,39.17822,16.79167, –39.17822,16.79167" Alignment="Center"/>

The above is a fragment from a typical script file. This particular fragment completely defines the appearance and geometric properties of a single text element. A typical script file may include many such text elements in addition to image elements and various other properties that define the appearance of the final art work/image. Properties of the text element above are in italics below:
Text="{[Name 14-Maybe a parent]saurous[Bluesaurous]}"

This property defines the immutable parts of the text element and its relationship to mutable parts of the text element. It also defines how the user interface will present this text element to the end user. Specifically this text element is named "Name 14" and the user would see "Maybe a parent" in a field to prompt them to modify the text. In this example the user has modified the element by supplying the user text "Christopher." The combination of the user text (mutable text) and the scripted text (immutable text) would be that the final art work would display the text "Christohpersaurous". The default value of the text element (prior to the user supply the text "Christopher") is "Bluesaurous."
Color="0xFF0000" Shadow="0xFFFFFF"

The above properties define the color of the text and the color of the drop shadow associated with the text. The colors are specified as a 24 bit RGB value.
FontName="Duality" FontSize="20"
The above properties define the font family and font size used for this text element.
Scale="2,2" Rotation="45.0" Translation="5051.9,3137.9" Bounds="–39.17822,–16.79167,39.17822,–16.79167, 39.17822,16.79167,–39.17822,16.79167"

The above properties define the geometric properties of the text element i.e. its size, location, scaling and bounding rectangle.
Alignment="Center"

The above property defines the alignment of the text within its geometric area. As it typical with text layout schemes, the text can be either left, center or right aligned.

As described above, the user interface in the present invention allows the user to modify the properties of the text element within his/her web browser. The modified script file is subsequently transmitted back to the data server for rendering. In short, the present invention provides complex image editing by proxy.

Figure 5:
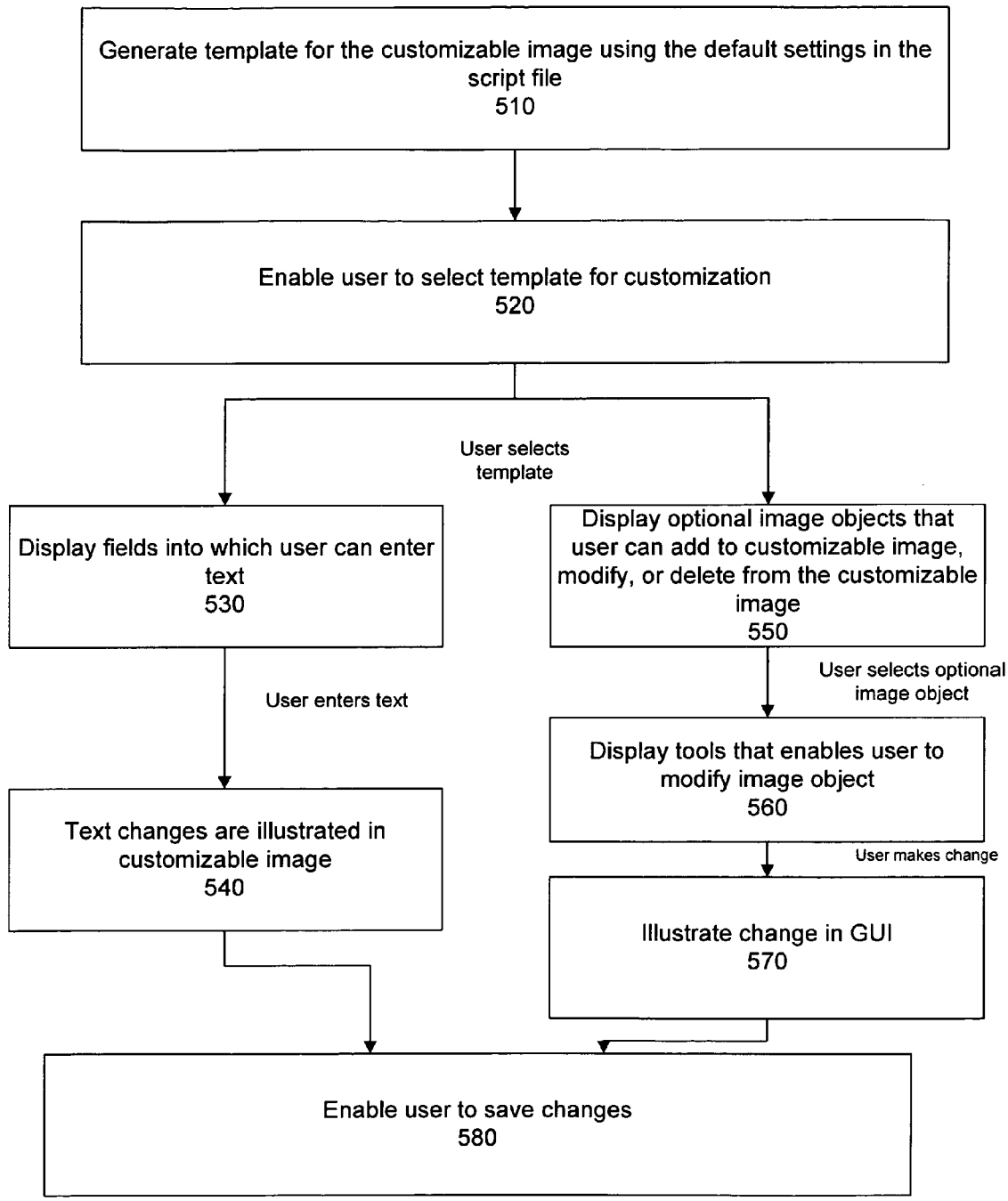
FIG. 5 is a flowchart that illustrates an example process, according to one embodiment of the present invention, for generating a graphical user interface within a user's web browser

FIG. 5 illustrates an example process for generating a graphical user interface within a user's web browser. In this example, it is assumed that a user can customize a base image by personalizing text elements and by adding or deleting graphical objects to/from the base image. By running the script file, the web browser generates a template for the customizable image(s) using the default settings in the script file (510) and then enables the user to select the template for customization (520).

To enable the user to customize the textual elements, the web browser then displays fields into which the user can enter text (530). In one embodiment, the fields are associated with hints or suggestions for the user. The fields are mapped to text elements in the customizable image, and, as the user enters text into the fields, the text changes are illustrated in the customizable image (540). As discussed above, a field can be mapped to more than one text element. In one embodiment, when a user enters text into a field, the user interface briefly zooms to one or more of the text elements associated with such field in the displayed image so that the user can see the change to the text element. Also, in one embodiment, when a user selects a text element, the user interface highlights the field to which that text element corresponds.

The GUI also displays optional image objects that a user can add to the base image, modify, or delete from the base image (550). In one embodiment, objects that can be added to the base image are displayed in a sub-window in the GUI. If a user selects a mutable image object on the base image, the user interface also displays tools which enable the user to modify the image object, such as tools that enable a user to rotate an object, move an object, resize an object, and change the color of an object (560). In one embodiment, when a user selects a mutable object on the customizable image, the user interface zooms in on such object. If the user adds, modifies, or deletes an image object, the change is illustrated in the GUI (570).

The user interface enables the user to save the changes to the image (580). As discussed above, in the preferred embodiment, the user interface may also provide the user with the ability to purchase the image on a medium (such as a canvas print, a book, or puzzle), or share the image with other people.

Figure 6A:
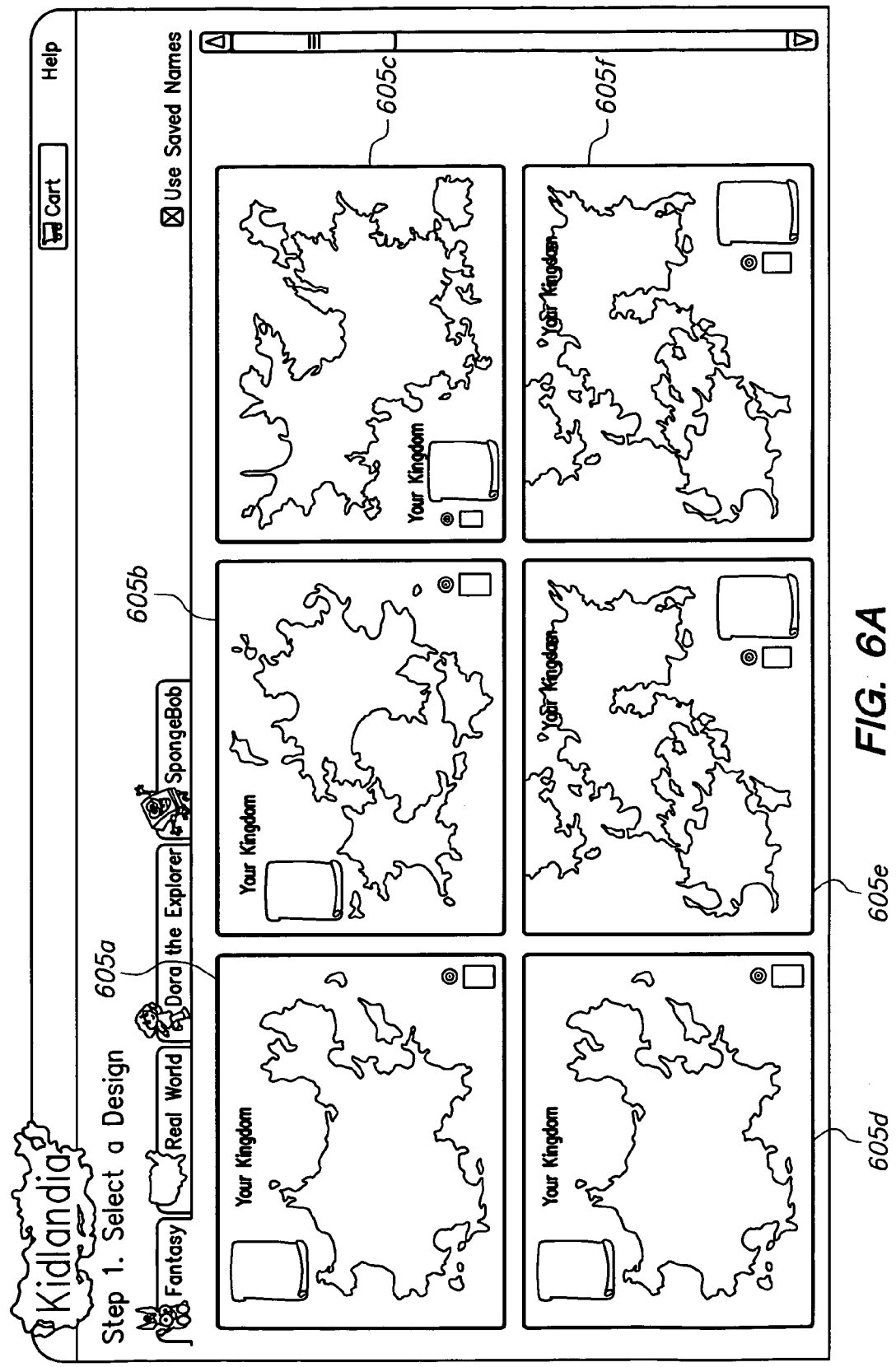
FIGS. 6a-6f are screen shots of an example graphical user interface according to one embodiment of the present invention.
Figure 6B:
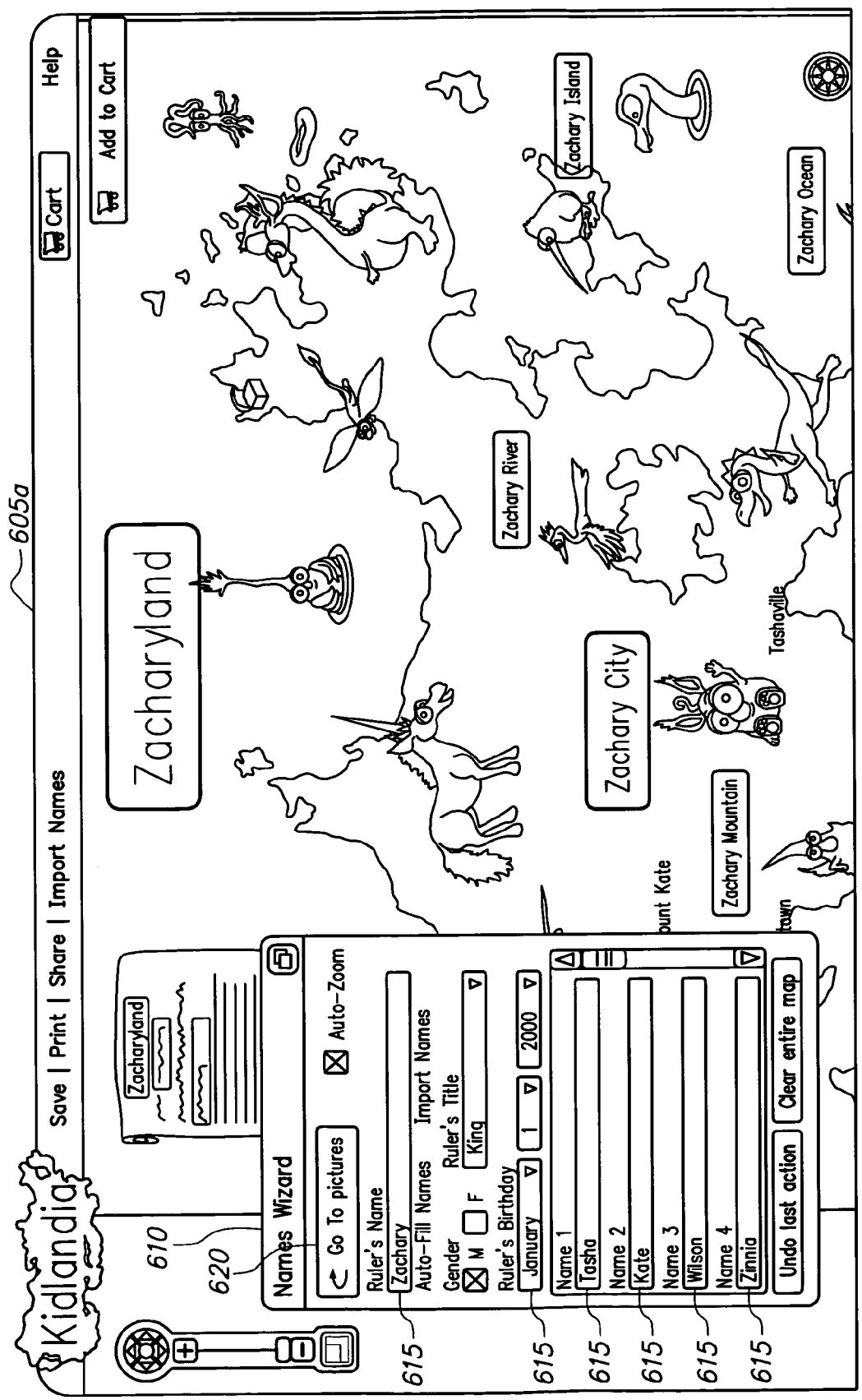

FIGS. 6a-6f illustrates an example user interface in accordance with the method of FIG. 5. In this example, a user can customize a number of children's fantasy maps. FIG. 6a illustrates templates 605a-605f that a user can customize. In FIG. 6b, a user has selected a template 605a to customize. The template 605a is generated using default values in the computer-readable script. The template includes default text elements and image objects that the developer added to the map.

The user interfaces includes a "names wizard" 610 that includes fields that each correspond to one or more text elements in the map. By entering text in the fields 615, the user changes text on the template 605a. For example, the default text "Your Kingdom" (see FIG. 6a) is changed to "Zacharyland" (FIG. 6b) when a user types "Zachary" in the "Ruler's Name" field. Some of the fields (e.g., "Ruler's Name") correspond to two or more text elements in the map.

Figure 6C:
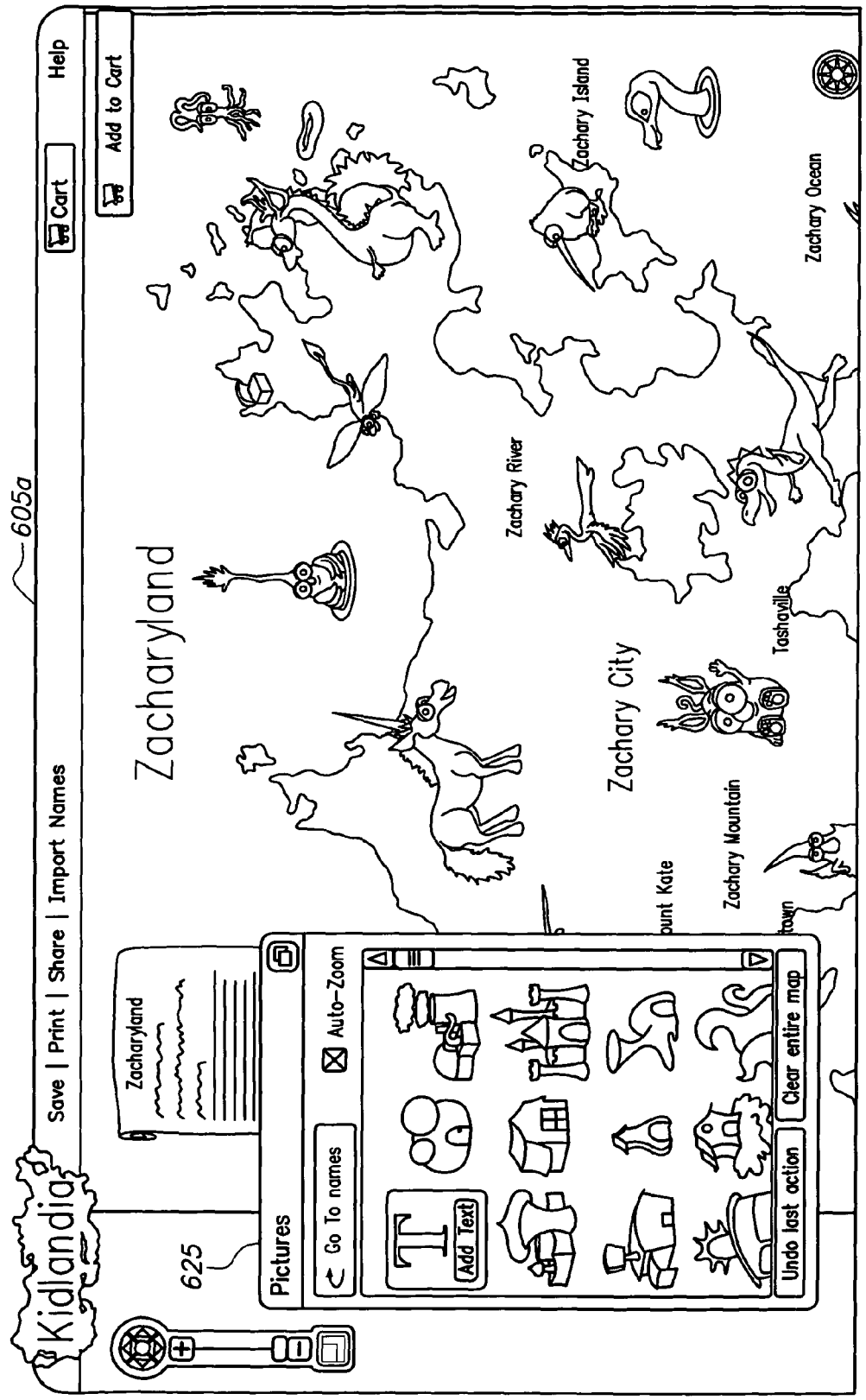

The user can click on the "Go To pictures" button 620 to pull up a "Pictures" window that displays optional image objects that a user can add to the map. FIG. 6c illustrates the "Pictures" window 625. In this example, a user can drag an image object from the picture window 625 onto the template 605a.

Figure 6D:
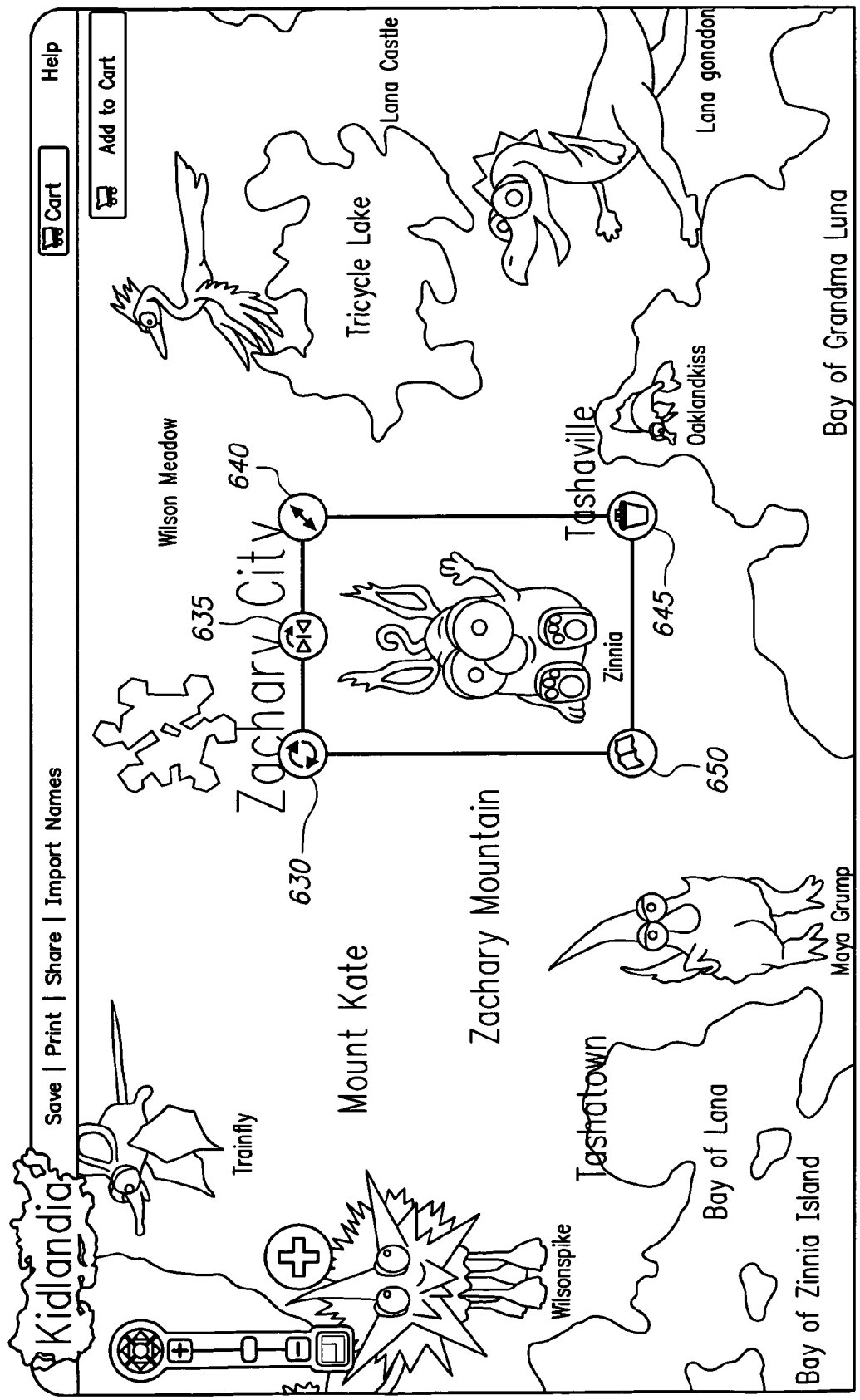

FIG. 6d illustrates tools that appear when the user selects a mutable image object on the customizable image. In this example, the tools perform the following functions:

Tool 630 enables a user to rotate the object.
Tool 635 enables a user to flip the image object.
Tool 640 enables a user to resize the image object.
Tool 645 enables a user to delete the image object.
Tool 650 enables a user to read or edit a story associated with an image object.

The developer may have a default story, or may provide a blank space into which a user can type a story.

In a further embodiment, there is also a tool that enables a user to associate a Universal Resource Locator (URL) link with an image object.

Figure 6E:
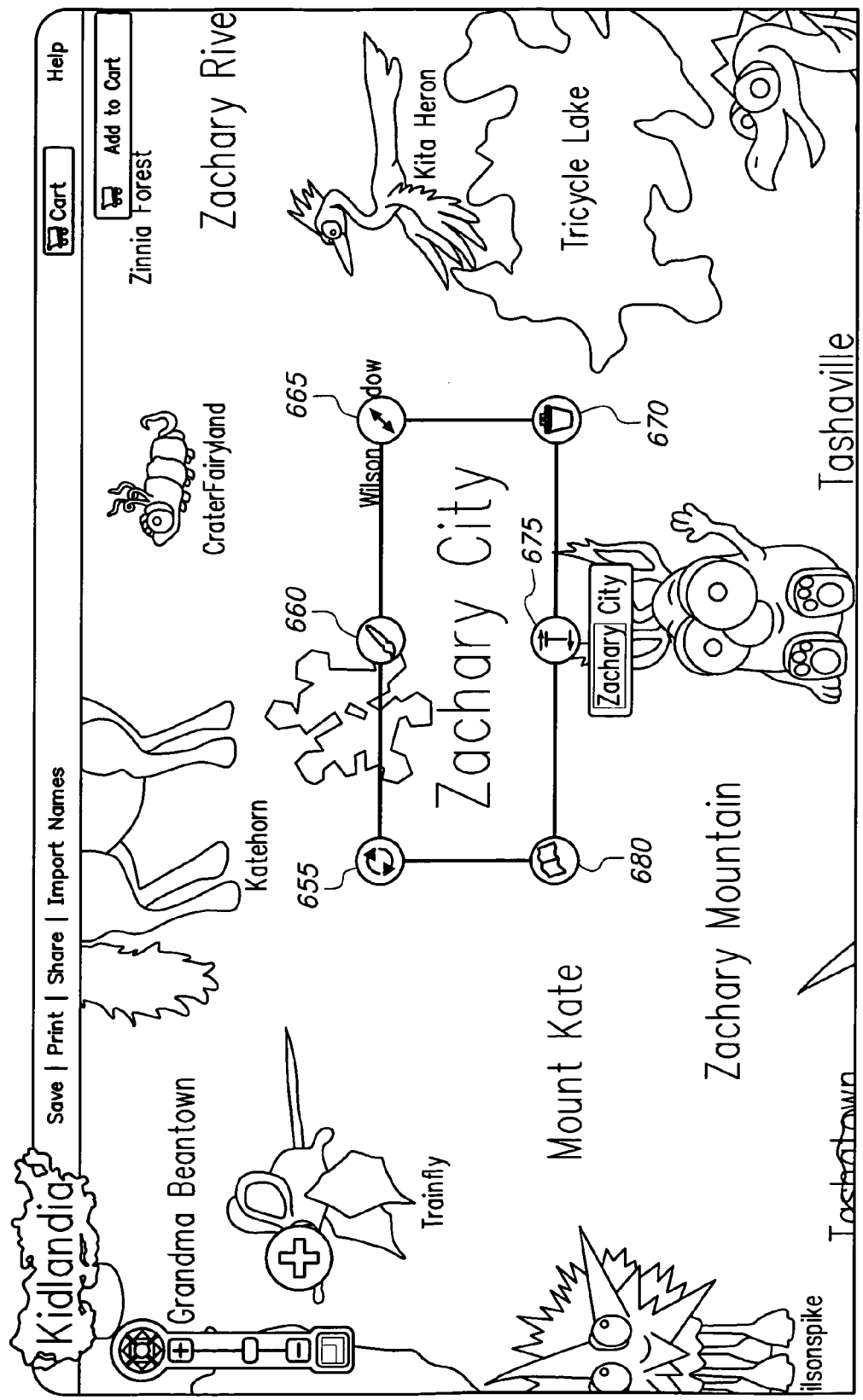

FIG. 6e illustrates tools that appear when a user selects a text element on the customizable image. In this example, the tools perform the following functions:

Tool 655 enables a user to rotate the text element.
Tool 660 enables a user to change the color of the text.
Tool 665 enables a user to resize the text.
Tool 670 enables a user to delete the text.
Tool 675 enables a user to change the alignment of the text.
Tool 680 enables a user to read or edit a story associated with the text element.

In a further embodiment, there is also a tool that enables a user to associate a URL link with a text element.

Figure 6F:
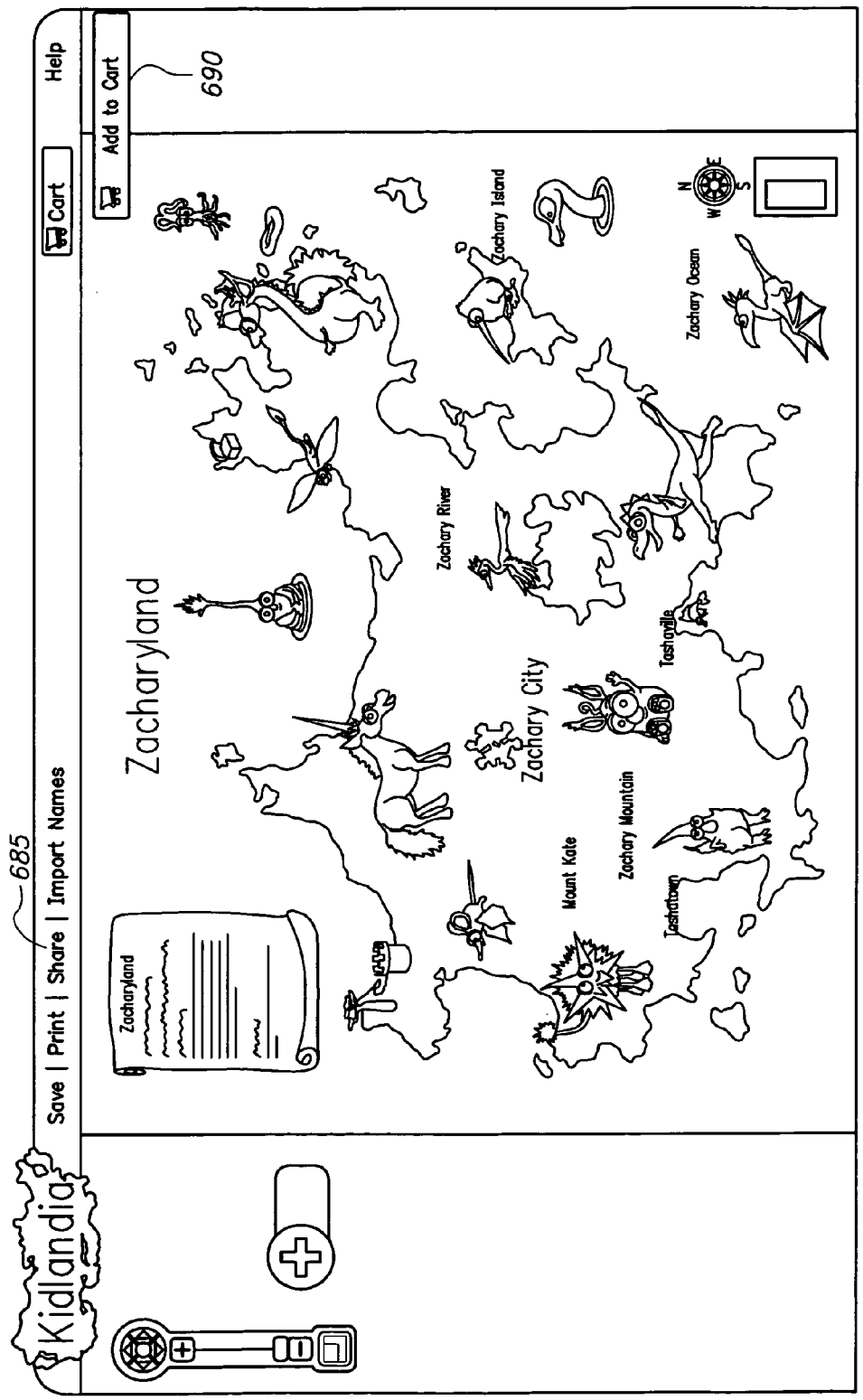

FIG. 6f illustrates an example of a customized image created by a user. As illustrated in FIG. 6f, the user interface includes links/buttons 685, 690 that enable a user to share or order a print of the customized image(s).

FIG. 7 illustrates a method for enabling a user to share a customized image. When a user saves a customized image, the user-modified script associated with the image is saved on the server-side (e.g., on Order Management Server 140) (step 710). The script is associated with a unique identifier ("unique ID") (step 720). If a user elects to share a customized image with one or more other people, the unique ID is then embedded into an URL which is then sent to the designated recipients (such as by an email invite) (step 730). The URL is a URL for the Order Management Server. When a recipient clicks on the URL, a request is sent to the Order Management Server with the unique ID (step 740). The Order Management Server then obtains the user-modified script file and image set associated with such unique ID (step 750), and it sends the script file and a lower-resolution version of image set to the requesting web browser (step 760). The resolution sent depends on the requesting computer and connection rate. The requesting web browser then generates the image using the user-modified script and the lower-resolution image set (step 770).

In a further embodiment of the invention, other users can further customize the image, and, thus, further modify the user's script file. In this way, multiple people can collaborate on customizing an image or set of images. In such case, when a recipient clicks on the URL, a GUI is generated via which the recipient can modify the first user's script file. In yet another embodiment of the invention, multiple people can collaborate on an image(s) at the same time, and the Data Server uses standard conflict resolution procedures in the event of conflicting changes.

Figure 8:
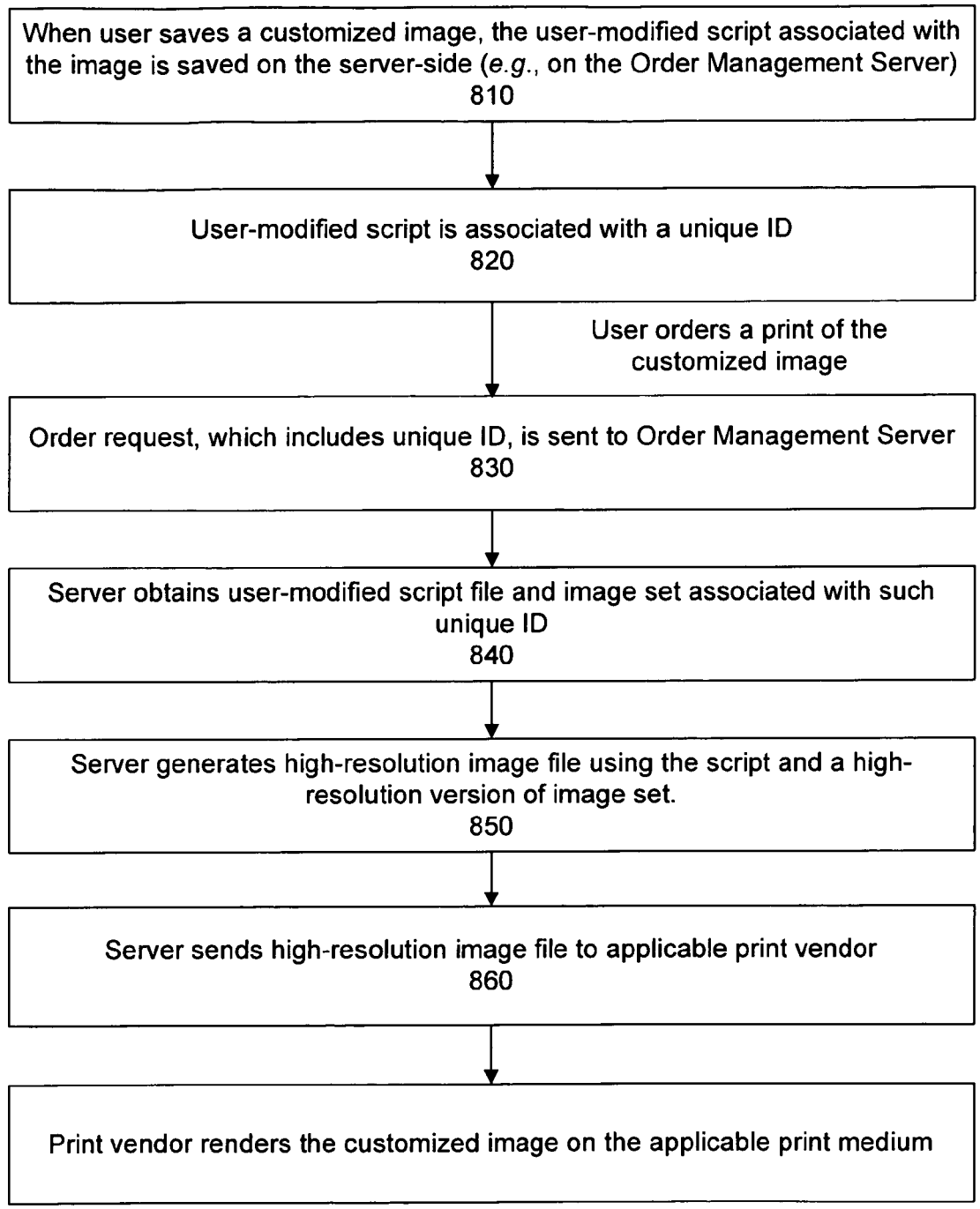
FIG. 8 is flowchart that illustrates an example of the print ordering process according to one embodiment of the present invention.

FIG. 8 illustrates an example of the ordering process. As stated above, when a user saves a customized image (or images), the user-modified script file with the user's changes is saved on the server-side and associated with a unique ID (steps 810, 820). This unique ID is provided to the user's web browser. When the user click a button to order a print of the customized image(s) on a select media, the user's web browser sends the order request, along with the unique ID, to the Order Management Server 140 (step 830). The Order Management Server 140 obtains the user-modified script file and the highest-resolution image set associated with the unique ID (step 840). It then generates a high-resolution image file from the high-resolution image set and the user-modified script file (step 850). The Order Management Server 140 sends the high-resolution image file to the applicable print vendor (step 860), which then renders the image on the applicable print medium (e.g., book, canvas print, puzzle, cloth, etc.) (step 870).

As discussed above, URLs can be associated with text elements or mutable image objects in a customizable image. A user can click through to games, other customizable images (such as other maps like the fantasy map shown in FIGS. 6a-6f), or a social network.

In a further embodiment of the invention, the customized image is an interface to a social network. In such embodiment, URLs are associated with one or more image objects on the customized image. For example, in the map illustrated in FIG. 6f, one or more of the image objects can be associated with URLs that link the user to other users' maps or to a social network, such as FACEBOOK. In such case, the user can customize the links associated with image objects.

This invention is discussed with respect to images, but the invention could be used on other types of media.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method on a computer system for enabling a user to create a customized, high-resolution art print via the Internet, comprising:

creating an image set for a customizable image, wherein the image set includes at least one immutable base image;

creating a computer-readable script that specifies (i) how to generate the customizable image using the image set, (ii) ways in which the customizable image can be modified; and (iii) how to generate a graphical user interface via which a user can modify modifiable image data in the computer-readable script;

storing the computer-readable script and multiple resolutions of the image set on a server;

downloading the computer-readable script and a lower-resolution version of the image set to a user's web browser;

generating a user interface in the user's web browser based on the computer-readable script, wherein the graphical user interface enables the user to customize the customizable image and wherein, prior to the user making changes to the customizable image, the graphical user interface displays a default version of the customizable image based on default values for the customizable image in the computer-readable script, wherein the graphical user interface includes: displaying the fields in the graphical user interface wherein a user can enter text values for the field, in response to a user entering text into one of the fields, modifying each text element in the computer-readable script to which such field is mapped with the user-entered text and displaying the change to each such text element in the customizable image displayed in the graphical user interface, wherein at least one of the fields is mapped to a plurality of text elements in the script, wherein the graphical user interface is further used to edit one of a story, a fantasy map, a family tree, or childrens' artwork, that comprises the text elements in the image;

as the user makes changes to the customizable image via the graphical user interface, modifying the computer-readable script to reflect the user's changes, wherein the changes include, in addition to the text entry and editing: rotating an image, flipping an image, or resizing an image;

sending the modified computer-readable script to the server;

printing a high-resolution art print of the customizable image, as modified by the user, using the modified script file and a high-resolution version of the image, such that every change made by the user in the low resolution versions are maintained in the high resolution art print and scaled to fit the precision of the high resolution art print, wherein the downloading and sending steps are performed at rates at least five times faster than the rates for downloading and sending the high resolution version respectively.

2. The method of claim 1, wherein the computer-readable script:
references the image set;
defines text elements added to the base image, wherein, if a text element is modifiable, the script specifies which portion of the text element is modifiable;
defines fields to display to the user in the graphical user interface to prompt to the user to enter values for the modifiable portions of the text elements; and
maps such fields to modifiable portions of the text elements.

3. The method of claim 2, wherein generating the graphical user interface comprises:
displaying the fields in the graphical user interface, wherein a user can enter text values for the field;
in response to a user entering text into one of the fields, modifying each text element in the computer-readable script to which such field is mapped with the user-entered text, and displaying the change to each such text element in the customizable image displayed in the graphical user interface.

4. The method of claim 3, wherein at least one of the fields in the graphical user interface is mapped to a plurality of text elements in the script.

5. The method of claim 2, wherein in response to a user selecting a text element on the customizable image, displaying tools that enable the user to modify the text element.

6. The method of claim 5, wherein such tools include a tool for changing the color of the text element, a tool for resizing the text, a tool for changing the alignment of the text, and a tool to rotate the text.

7. The method of claim 6, wherein such tools also include a tool that enables a user to read or edit a story associated with the text element.

8. The method of claim 1, wherein the image set includes mutable image objects.

9. The method of claim 8, wherein generating the graphical user interface further comprises:
in response to a user selecting a mutable image object on the customizable image displayed in the graphical user interface, displaying tools that enable the user to modify the mutable image object.

10. The method of claim 9, wherein the tools include a tool for rotating the mutable image object, a tool for flipping the mutable image object, a tool for resizing the mutable image object, and a tool for deleting the mutable image object.

11. The method of claim 10, wherein the tools also include a tool for enabling a user to read or edit a story associated with the mutable image object.

12. The method of claim 8, wherein a user can associate a URL with a mutable image object.

13. The method of claim 1, further comprising enabling a user to share the customized image with one or more other users.

14. The method of claim 1, wherein the high-resolution version of the image is generated in response to a user submitting an order for a print of the customizable image.

15. A method on a computer system for enabling a user to create a customized, high-resolution art print via the Internet, comprising:
creating an image set for a customizable image, wherein the image set includes at
least one immutable base image;
creating a computer-readable script that specifies how to generate the customizable image and how to generate a graphical user interface via which a user can modify image data in the computer-readable script, wherein the computer-readable script references the image set and specifies (i) a plurality of variables that can be inputted by a user to customize the customizable image, and (ii) the way such variables can be used to customize the customizable image;
storing the computer-readable script and multiple resolutions of the image set on a server; downloading the computer-readable script and a lower-resolution version of the image set to a user's web browser;
generating a user interface in the user's web browser based on the computer-readable script, wherein the graphical user interface enables the user to customize the image and wherein, prior to the user making changes to the customizable image, the graphical user interface displays a default version of the customizable image based on default values for the customizable image in the computer-readable script, wherein the graphical user interface includes: displaying the fields in the graphical user interface wherein a user can enter text values for the field, in response to a user entering text into one of the fields, modifying each text element in the computer-readable script to which such field is mapped with the user-entered text and displaying the change to each such text element in the customizable image displayed in the graphical user interface, wherein at least one of the fields is mapped to a plurality of text elements in the script, wherein the graphical user interface is further used to edit one of a story, a fantasy map, a family tree, or childrens' artwork, that comprises the text elements in the image;
as the user makes changes to the customizable image via the graphical user interface,
modify the computer-readable script to reflect the user's changes, wherein the changes include, in addition to the text entry and editing: rotating an image, flipping an image, or resizing an image;
sending the modified computer-readable script to the server;
generating a high-resolution art print of the customizable image, as modified by the user, using the modified script file and high-resolution version of the image, such that every change made by the user in the low resolution versions are maintained in the high resolution art print and scaled to fit the precision of the high resolution art print, wherein the downloading and sending steps are performed at rates at least five times faster than the rates for downloading and sending the high resolution version respectively.

16. The method of claim 1, wherein the high-resolution version of the image is generated in response to a user submitting an order for a print of the customizable image.

17. A system for enabling a user to create a customized, high-resolution art print via the Internet, comprising:
an image-creation tool for creating an image set for a customizable image, wherein
the image set includes at least one immutable base image;
a script-creation tool for creating a computer-readable script that specifies (i) how to generate the customizable image using the image set, (ii) ways in which the customizable image can be modified; and (iii) how to generate a graphical user interface via which a user can modify modifiable image data in the computer-readable script;
a storage medium for storing the computer-readable script and multiple resolutions of the image set; a data server, operatively coupled to the image-creation tool, the script-creation tool and the storage medium, for downloading the computer-readable script and a lower-resolution version of the image set to a user's web browser;
a client computing device, operatively coupled to the data server via the Internet, for generating a user interface in the user's web browser based on the computer-readable script, wherein the graphical user interface enables the user to customize the customizable image, wherein the graphical user interface includes: displaying the fields in the graphical user interface wherein a user can enter text values for the field, in response to a user entering text into one of the fields, modifying each text element in the computer-readable script to which such field is mapped with the user-entered text and displaying the change to each such text element in the customizable image displayed in the graphical user interface, wherein at least one of the fields is mapped to a plurality of text elements in the script, wherein the graphical user interface is further used to edit one of a story, a fantasy map, a family tree, or childrens' artwork, that comprises the text elements in the image; prior to the user making changes to the customizable image, the graphical user interface displays a default version of the customizable image based on default values for the customizable image in the computer-readable script;
as the user makes changes to the customizable image via the graphical user interface, the client computing device modifies the computer-readable script to reflect the user's changes, wherein the changes include, in addition to the text entry and editing: rotating an image, flipping an image, or resizing an image; and after the user makes changes to the computer-readable script, the client computing device sending the modified computer-readable script to the data server; and an image rendering server, operatively coupled to the data server, for generating a high-resolution art print of the customizable image, as modified by the user, using the modified script file and a high-resolution version of the image, such that every change made by the user in the low resolution versions are maintained in the high resolution art print and scaled to fit the precision of the high resolution art print, wherein the downloading and sending steps are performed at rates at least five times faster than the rates for downloading and sending the high resolution version respectively.

18. The system of claim 17, wherein the computer-readable script:
references the image set;
defines text elements added to the base image, wherein, if a text element is modifiable, the script specifies which portion of the text element is modifiable;
defines fields to display to the user in the graphical user interface to prompt to the user to enter values for the modifiable portions of the text elements; and
maps such fields to modifiable portions of the text elements.

19. The system of claim 18, wherein generating the graphical user interface comprises:
displaying the fields in the graphical user interface, wherein a user can enter text values for the field;
in response to a user entering text into one of the fields, modifying each text element in the computer-readable script to which such field is mapped with the user-entered text, and displaying the change to each such text element in the customizable image displayed in the graphical user interface.

20. The system of claim 19, wherein at least one of the fields in the graphical user interface is mapped to a plurality of text elements in the script.

* * * * *